United States Patent
Lauterjung et al.

(10) Patent No.: US 7,039,137 B1
(45) Date of Patent: May 2, 2006

(54) METHOD FOR PROCESSING OFDM SIGNALS SIMULTANEOUSLY RECEIVED VIA A MULTIPLE ANTENNA SYSTEM

(75) Inventors: Juergen Lauterjung, Unterhaching (DE); Christoph Balz, München (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 09/701,782

(22) PCT Filed: Sep. 23, 1999

(86) PCT No.: PCT/EP99/07102

§ 371 (c)(1),
(2), (4) Date: Jan. 25, 2001

(87) PCT Pub. No.: WO00/25446

PCT Pub. Date: May 4, 2000

(30) Foreign Application Priority Data

Oct. 26, 1998 (DE) ............................... 198 49 318

(51) Int. Cl.
*H04B 7/10* (2006.01)
*H04L 1/02* (2006.01)

(52) U.S. Cl. .................. 375/349; 375/260; 375/355; 375/371; 370/204; 370/210; 370/480

(58) Field of Classification Search ................ 375/340, 375/349, 365, 371, 267, 275, 347, 260, 230, 375/298, 226, 355; 370/480, 210, 204, 503; 342/380
See application file for complete search history.

(56) References Cited

U.S. PATENT DOCUMENTS 3,633,107 A    1/1972    Brady (Continued)

FOREIGN PATENT DOCUMENTS

DE    19518858    7/1996

(Continued)

OTHER PUBLICATIONS

Wilson et al., "16 QAM Modulation with Orthogonal Frequency Division Multiplexing in a Rayleigh-Fading Environment", XP 997704, pp. 1660-1664.

(Continued)

*Primary Examiner*—Khai Tran
*Assistant Examiner*—Edith Chang
(74) *Attorney, Agent, or Firm*—Birch Stewart Kolasch & Birch LLP

(57) ABSTRACT

The aim of the invention is to process OFDM signals which are simultaneously received via a multiple antenna system having a plurality of separate receive channels. To this end, the channel correction values or the confidence values are determined in the receive channels for each carrier of the OFDM signal while using known techniques. In addition, the I/Q values of each individual carrier of the OFDM signal which are obtained in the OFDM demodulator are weighted with these channel correction values or confidence values. Afterwards, the I/Q values weighted in such a manner are totaled.

7 Claims, 3 Drawing Sheets

U.S. PATENT DOCUMENTS

| | | | |
|---|---|---|---|
| 5,191,576 A * | 3/1993 | Pommier et al. | 370/312 |
| 5,265,122 A | 11/1993 | Rasky et al. | |
| 5,530,725 A | 6/1996 | Koch | |
| 5,579,343 A | 11/1996 | Ohmura | |
| 5,761,613 A | 6/1998 | Saunders et al. | |
| 5,799,005 A | 8/1998 | Soliman | |
| 6,169,751 B1 * | 1/2001 | Shirakata et al. | 370/480 |
| 6,304,545 B1 * | 10/2001 | Armbruster et al. | 370/210 |
| 6,628,738 B1 * | 9/2003 | Peeters et al. | 375/371 |

FOREIGN PATENT DOCUMENTS

| | | |
|---|---|---|
| DE | 19638404 | 2/1998 |
| EP | 0 600 547 A1 | 6/1994 |
| EP | 0600547 | 6/1994 |
| EP | 0 600 547 B1 | 2/2000 |
| WO | WO-91/20142 | 12/1991 |

OTHER PUBLICATIONS

Masahiro, Hitoshi and Richard, NTT and Lucent, doc:IEEE 802.11-98/193 (May 1998).

Bulumulla et al., "An Adaptive Diversity Receiver for OFDM in Fading Channels", Department of Electrical Engineering, University of Pennsylvania, IEEE, pp. 1325-1329 (1998).

Cimini, Jr., et al., "OFDM with Diversity and Coding for Advanced Cellular Internet Services", AT&T Labs—Research, IEEE, pp. 305-309 (1997).

European Standard (Telecommunications Series), "digital Video Broadcassting (DVB); Framing structure, channel coding and modulation for digital terrestrial television", EN 300 744 V1.1.2 (Aug. 1997).

McGibney et al., "Implementation of a High Performance Wireless LAN", pp. 645-650, IEEE.

Tufvesson et al., "Pilot Assisted Channel Estimation for OFDM in Mobile Cellular Systems", Department of Applied Electronics, Lund University VTC '97.

Proakis, Digital Communications, Third Edition, "Diversity Techniques for Fading Multipath Channels", pp. 777-781 (1995).

Gibson, The Mobile Communications Handbook, IEEE Press, pp. 172-173.

Proceedings of the IRE, pp. 1074-1103.

Sawahashi et al., Electronic Letters, vol. 32, No. 6, pp. 522-523 (Mar. 14, 1996).

Baum et al., "A Comparison of Differential and Coherent Reception for a Coded OFDM System in a Low C/I Environment", IEEE, pp. 300-304 (1997).

Kim, "Coding Strategies for OFDM with Antenna Diversity for High-Bit-Rate Mobile Data Applications", VTC '98, pp. 763-767 (1998).

Lamarca, "Multichannel Receivers for OFDM and TDMA in Mobile Communications", IEEE, pp. 3865-3868 (1997).

Casas et al., "OFDM for Data Communication Over Mobile Radio FM Channels—Part II: Performance Improvement", IEEE Transactions on Communications, vol. 40, No. 4, pp. 680-683 (Apr. 1992).

Kim et al., BER Analysis of QAM with MRC Space Diversity in Rayleigh Fading Channel, IEEE, pp. 482-485 (1995).

Eng et al., "Comparison of Diversity Combining Techniques for Rayleigh-Fading Channels", IEEE Transactions on Communications, vol. 44, No. 9, pp. 1117-1129 (Sep. 1996).

Sunaga et al., "Performance of Multi-Level QAM with Post-Detection Maximal Radio Combining Space Diversity for Digital Land-Mobile Radio Communication", IEEE Transactions on Vehicular Technology, vol. 42, No. 3, pp. 294-301 (Aug. 1993).

Sampei et al., "Rayleigh Fading Compensation for QAM in Land Mobile Radio Communications", IEEE Transactions on Vehicular Technology, vol. 42, No. 2, pp. 137-147 (May 1993).

Sampei et al., "Rayleigh Fading Compensation Method for 16QAM in Digital Land Mobile Radio Channels", IEEE, pp. 640-646 (1989).

Cimini, Jr., "Analysis and Simulation of a Digital Mobile Channel Using Orthogonal Frequency Division Multiplexing", IEEE Transations on Communications, vol. COM.33, No. 7, pp. 665-675 (Jul. 1985).

Kalet, "A Multitone-Antenna Diversity Approach to PCS Communications", pp. 473-476 (1996).

Ulrich Reimers, Digitale Fernsehtechnik, Datenkompression und Ubertragung fur DVB, 2., vollstandig uberarbeitete Auflage, Mit 175 Abbildungen.

\* cited by examiner

METHOD FOR PROCESSING OFDM SIGNALS SIMULTANEOUSLY RECEIVED VIA A MULTIPLE ANTENNA SYSTEM

This application is the national phase under 35 U.S.C. § 371 of PCT International Application No. PCT/EP99/07102, which has an International filing date of Sep. 23, 1999, and which designated the United States of America.

BACKGROUND OF THE INVENTION

1. Field of the Invention

The present invention relates to a process for processing OFDM-signals received simultaneously by a multi-antenna system with a plurality of separate receiving channels.

2. Description of the Background Art

In modern digital technology, so-called OFDM-systems (Orthogonal-Frequency-Division Multiplex) or COFDM-systems (coded OFDM) are used for data transmission (sound, video or other data). In accordance with this principle, prior to transmission the digital data stream is split via a transmitter network into a plurality of sub-signals, each of which is transmitted separately on an individual carrier. In the so-called DVB-T-system (Digital-Video Broadcasting, terrestrial), which also serves for the transmission of data of a general type, 1705 or 6817 individual carriers are used for example. In the receiver these items of subsidiary information are recombined to form a complete item of information of the transmitter-end digital data stream.

These OFDM-systems are standardized in terms of the transmitting-end conditioning and receiving-end recovery of the data (for example in the DAB-standard ETS 300401 for DAB and in the standard ETS 300744 for DVB-T). It is a common feature of these OFDM-systems that at the receiving end the high-frequency signal received by an antenna is demodulated in an OFDM-demodulator, preferably after conversion into an intermediate frequency, and in this way the associated I/Q-values are acquired for each individual carrier. In a so-called pilot-tone-corrected OFDM-system, as used in DVB-T, a channel correction value is determined simultaneously from the co-transmitted pilot tones. For each individual carrier, each I/Q-value is complexly multiplied by the relevant channel correction value. This ensures that all the carriers have constant amplitudes, possible breaks in amplitude of individual carriers of the overall reception band, caused for example by multipath reception disturbances, being appropriately compensated and corrected.

In such systems, in addition to the individual data, it is also common practice to transmit so-called confidence values and thus to influence the further processing of the acquired digital values in so-called soft-decision processes. These two known possibilities of correcting the I/Q-values via the channel correction or the obtained digital values through the confidence values are state of the art in receiver technology.

To improve the signal/noise ratio, in particular for the mobile reception of such OFDM-signals, it is known to provide a multi-antenna system with two or more antennae and correspondingly assigned, separate receiving channels, and to combine the analogue received signals in the receiver in the HF- or IF-plane of this plurality of receiving channels. The analogue signals of the individual receiving channels are added, having been weighted in a frequency-dependent manner, for example, as a function of the received power. Here, however, not only the useful signals but also the noise components are combined, which in principle can even result in an impairment of the signal/noise ratio compared to the most favourable receiving channel for the relevant sub-band. These analogue combining processes also require a very high outlay and follow the relevant channel properties only relatively slowly. In the case of frequency-selective addition, they have only relatively flat selection curves, i.e. sharp breaks in the receiving frequency range cannot be corrected.

SUMMARY OF THE INVENTION

It is therefore an object of the present invention is to indicate a process for combining OFDM-signals received simultaneously by a multi-antenna system which avoids these disadvantages and leads to a distinct improvement in reception.

In accordance with the invention, in each individual receiving channel of the multi-antenna system, the values for channel correction or confidence anyhow acquired therein according to the relevant standard are used for a corresponding weighting of the demodulated I/Q-values. In the DAB-system, in which the confidence values are determined in a known manner, these can be used in accordance with the invention to add the relevant I/Q-values in an appropriately weighted manner and thus, from the relevant receiving branches having a good signal/noise ratio for the received signal, to obtain a corresponding mean value of the individual received signals of the multi-antenna system, which is particularly advantageous for the mobile reception of DAB-signals where, due to the properties of the transmission channel, a more difficult reception situation exists than in the case of stationary reception. In this way fading disturbances can be corrected.

It is particularly advantageous to perform this correction as a function of the channel correction values as provided in the DVB-T-system. Here again, mobile reception with a good signal/noise ratio is possible, this weighted evaluation of the received signals in the individual receiving channels facilitating a particularly simple analysis algorithm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
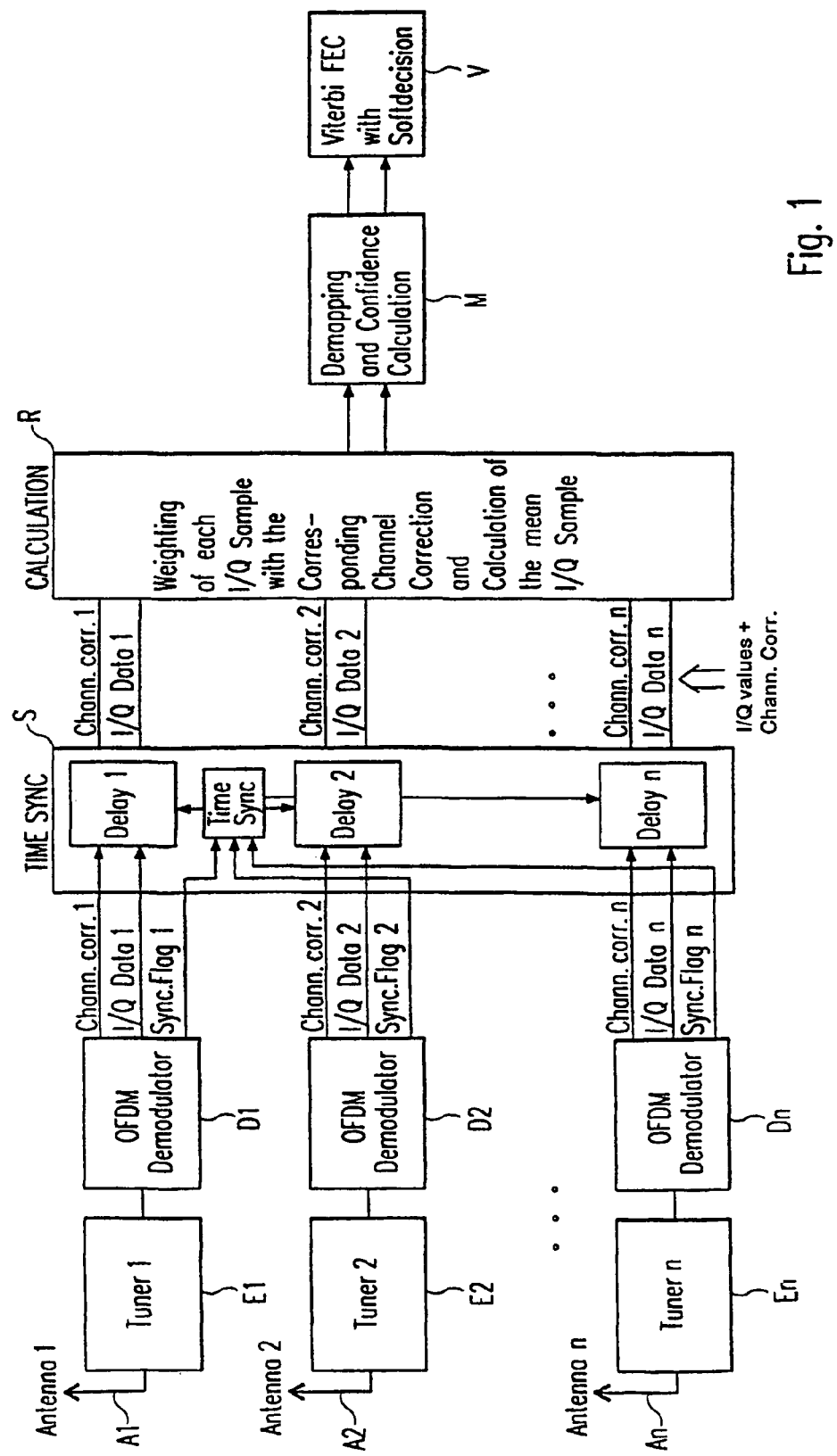
FIG. 1 is a circuit diagram of the present invention according to a preferred embodiment.

FIG. 1 is the fundamental circuit diagram of a receiving arrangement for processing pilot-tone-supported OFDM-signals in which the signals of the individual carriers of the multi-antenna system are digitally combined upstream of the decision device. The received multicarrier OFDM-signals are received via a plurality of antennae A1 to An and can optionally be converted into a suitable intermediate frequency via individual receivers E1, E2 to En. All the receivers E1 to En are set at the same receiving frequency and for simplicity the down-conversion into the intermediate frequency optionally can be performed using a common oscillator. Then, in each of the n receiving channels, the demodulation of the OFDM-signals is in each case performed in separate demodulators D1 to Dn and at the same time the associated channel correction values are also acquired, these being a gauge of the level of the individual carriers of the multicarrier system and thus also a gauge of the probability that the symbol transmitted with this carrier is correct.

The I/Q-values available for each individual carrier at the output of the demodulators are fed to a time synchronisation device S, in which possible time offsets of the total number n of I/Q-signals are corrected by corresponding delay devices so that the I/Q-values of corresponding carriers occur simultaneously at the output of this time synchronisation device S, which values are then fed to a processing device R and processed therein as will be described in the following. The time synchronisation can be performed using synchronisation flags known in association with OFDM demodulators.

Figure 2:
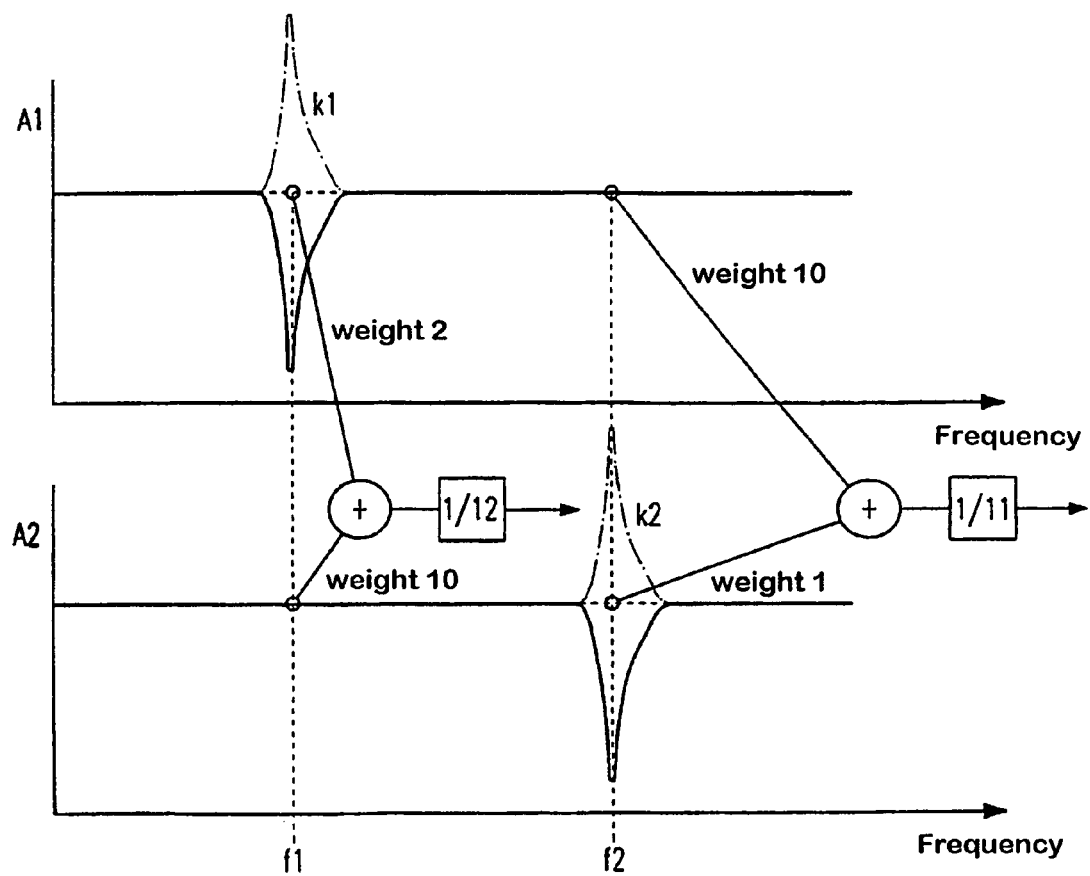
FIG. 2 is a graph illustrating an example of weighting and adding for two antenna.

Before the I/Q-values, thus conditioned in known manner, are reduced to individual bits in the decision (demapping) device M, in the processing device R they are complexly multiplied by a value k proportional to the reciprocal value of the relevant channel correction, and thus are weighted. This weighting is firstly performed individually, for each I/Q-value for all n receiving channels. The I/Q-values are thus weighted particularly high if they are changed as little as possible by the channel correction. Then all the mutually assigned I/Q-values are added and divided by the sum of all the weights. FIG. 2 illustrates this type of weighting and addition for two antennae A1 and A2. Of the total of 1705 or 6817 individual carriers of the system, at the frequency f1 the received carrier is received only with a reduced amplitude via the antenna A1 due to fading. This is expressed by the reciprocal value k1 of the channel correction obtained for this receiving channel. The carrier at the frequency f1 is thus weighted with a relatively low weight, for example only with the channel correction value 2, while the carriers in the range below and above the frequency f1, which are received at the full level, are weighted very high, for example with the weigh 10. In the case of the antenna A2 this low weighted receiving range lies at a different location at the frequency f2.

When the I/Q-values, differently weighted in this way with for example 2 and 10 in the f1 range, are now added and finally divided by the total number of all the weights (in the example 12), a mean value is obtained which has a constant good reception value over the entire frequency range. The averaged I/Q-values thus obtained in the processing device R are then fed to the decision device M and further analyzed therein in known manner. Optionally, the confidence of the information can also be calculated therein. Then the data are further processed in a conventional Viterbi-decoder V with soft decision.

Figure 3:
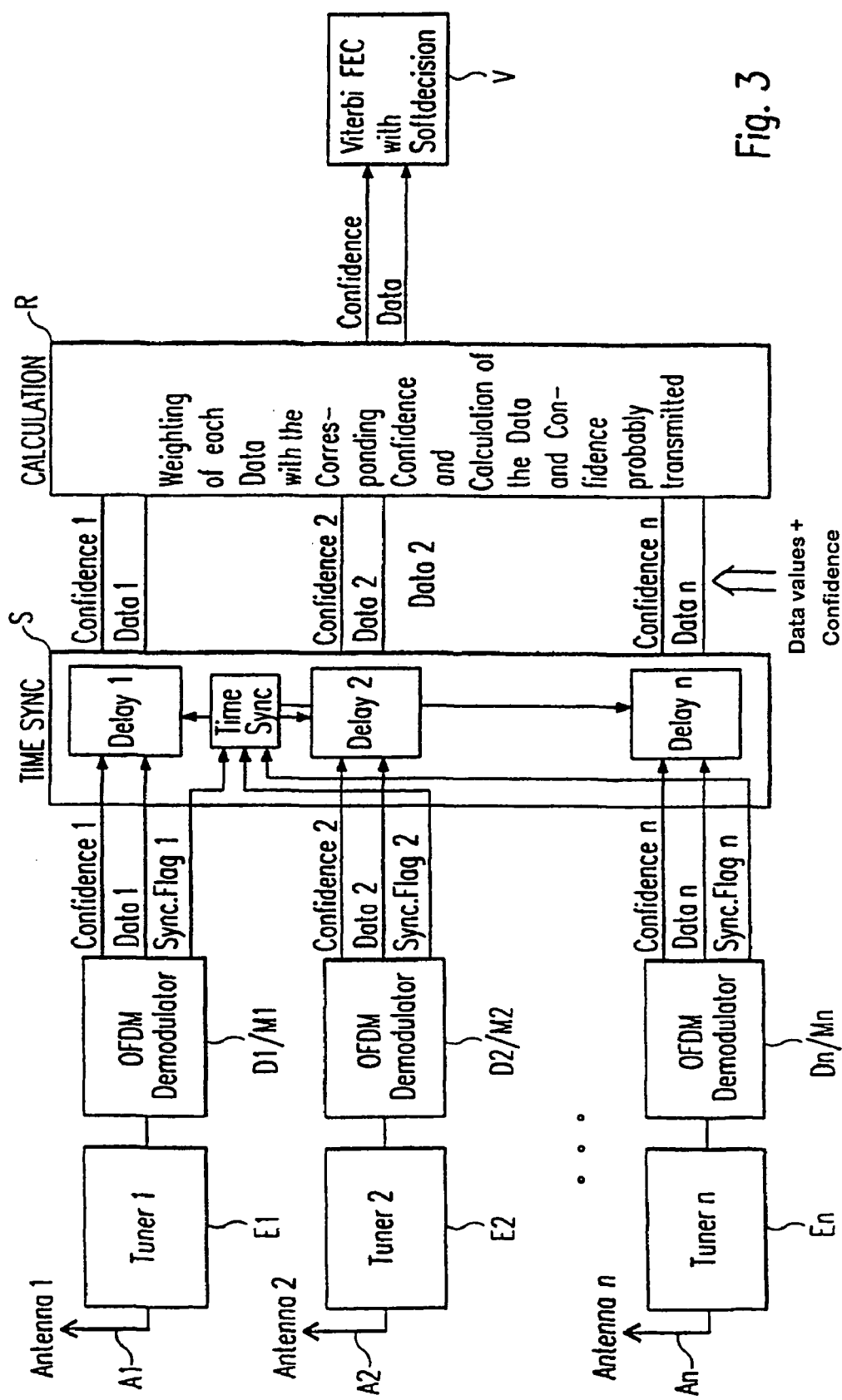
FIG. 3 is a circuit diagram of the present invention according to an alternate embodiment.

FIG. 3 illustrates an exemplary embodiment of a receiving arrangement for processing OFDM-signals in a multi-antenna system by digital combination downstream of the decision device M. In many cases the I/Q-values are available for further processing not upstream of the decision device but only downstream of the decision device M, which in this case for example is integrated in the demodulator D1 for each individual receiving channel. Thus the data words reduced to individual bits are already available at the output of the demodulator and indeed together with the confidence values which have likewise been calculated in the decision devices M1 to Mn and which, following the time synchronisation in the time synchronisation device S, are weighted and further processed in the processing device R as follows.

Each individual data word of the n receiving channels is reduced to the original I/Q-values using a suitable algorithm. The thus obtained, corresponding I/Q-values are then complexly multiplied by the value of the relevant confidence information, whereupon all the thus weighted I/Q-values are added again as described in association with FIG. 2 and then divided by the number of all the weights. When the I/Q-values have been reduced to the data bits, the thus determined mean value of all the I/Q-values is then fed again to the Viterbi-decoder with soft decision V and further processed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for processing OFDM-signals, comprising the steps of:
   receiving substantially simultaneously the OFDM-signals by a multi-antenna system with two or more corresponding separate receiving channels;
   in each separate receiving channel, obtaining the I/Q-values of each individual carrier of the OFDM-signals and determining channel correction values or confidence values from pilots for each individual carrier of the OFDM-signals;
   deriving weighting factors from the channel correction or confidence values for each I/Q-value of each individual carrier and each separate receiving channel, by which weighting factors the I/Q-values of each individual carrier of the OFDM-signals obtained in an OFDM-demodulator are weighted such that I/Q-values of carriers received at a low level are weighted low and I/Q-values of carriers received at a high level are weighted high; and
   adding the weighted I/Q-values and dividing the added weighted I/Q-values by the number of all the weighting factors.

2. The process according to claim 1, wherein the demodulated I/Q-values at the output of the OFDM demodulator are fed to a time synchronisation device so that the I/Q-values of corresponding carriers of the separate receiving channels are in each case simultaneously available for further processing.

3. The process according to claim 1, wherein the I/Q-values of each individual carrier of the OFDM-signals are weighted as a function of the channel correction values obtained from the pilots, such that low weighting factors are selected for large channel correction values and high weighting factors are selected for small channel correction values.

4. The process according to claim 1, wherein the weighted I/Q-values are obtained by complexly multiplying the I/Q-values with the corresponding confidence values.

5. The process according to claim 1, wherein each of the OFDM-signals received by the multi-antenna system has the same center frequency.

6. A method for receiving and processing OFDM signals, the method comprising the steps of:
  receiving substantially simultaneously the OFDM signals by a plurality of antennas, each of the plurality of antennas having a separate receiving channel;
  demodulating each of the received OFDM signals;
  acquiring channel correction values or confidence values for each of the demodulated OFDM signals;
  providing I/Q values for each of the demodulated OFDM signals;
  determining a weighting factor for each of the I/Q values on the basis of the channel correction values or confidence values associated with each of the OFDM signals;
  weighting each of the I/Q values by the corresponding weighting factor;
  determining a total weight by adding together the weighting factors of each of the weighted I/Q values;
  adding together each of the weighted I/Q values for each of the demodulated OFDM signals; and
  dividing the added weighted I/Q values by the total weight to determine a mean value, the mean value being utilized to maximize the signal to noise ratio of the received OFDM signals.

7. The method according to claim 6, wherein each of the separate receiving channels is set at substantially the same receiving frequency.

* * * * *